June 22, 1926.
R. RONALD
1,590,061
FOOD RECEPTACLE OR CARRIER
Filed Feb. 21, 1925
2 Sheets-Sheet 1
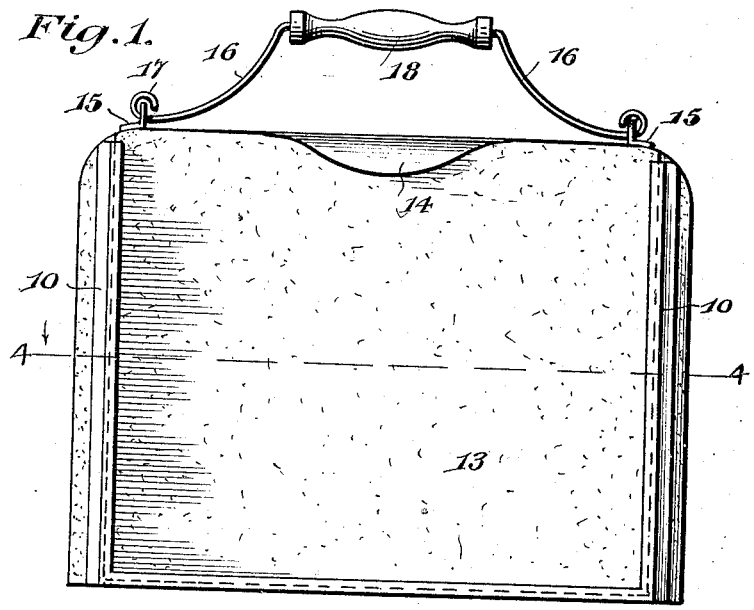
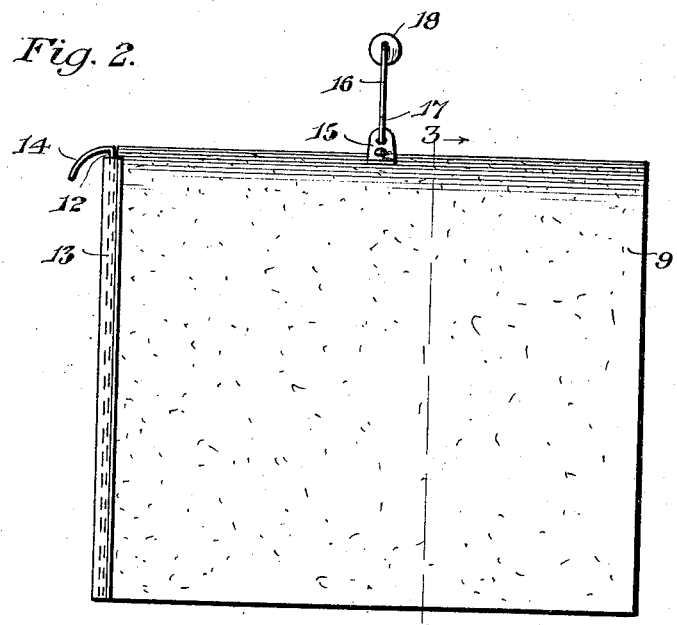
INVENTOR.
Rebecca Ronald
BY
Geo. F. Kimmel
ATTORNEY.

June 22, 1926.

R. RONALD 1,590,061

FOOD RECEPTACLE OR CARRIER

Filed Feb. 21, 1925

INVENTOR.
Rebecca Ronald,
BY
Geo. P. Kimmel, ATTORNEY.

Patented June 22, 1926.

1,590,061

UNITED STATES PATENT OFFICE.

REBECCA RONALD, OF VANCOUVER, BRITISH COLUMBIA, CANADA.

FOOD RECEPTACLE OR CARRIER.

Application filed February 21, 1925. Serial No. 10,942.

This invention relates to food receptacles or carriers and has for its primary object the provision, in a manner as hereinafter set forth, of a receptacle designed and constructed in such a manner that food placed therein, while hot, will stay in the heated condition for a considerable length of time.

Another object of the invention is the provision, in a manner as hereinafter set forth, of a receptacle designed for the storage and transportation of food, having a sliding tray therein which, when in position within the receptacle constitutes a shelf therefor, and when removed from the receptacle constituting a serving tray.

Another and final object of the invention is the provision, in a manner as hereinafter set forth, of a heat insulated food storage and transportation receptacle, of strong and durable construction, light weight, and inexpensive to manufacture.

The invention will be best understood from a consideration of the following detailed description taken in connection with the accompanying drawings, forming a part of this specification, with the understanding that the invention is not confined to any strict conformity with the showing of the drawings, but may be changed and modified so long as such changes and modifications mark no material departure from the salient features of the invention as expressed in the appended claim.

In the drawings:—

Figure 1 is a front elevation of the receptacle embodying this invention.

Figure 2 is a side elevation of the same.

Figure 3:
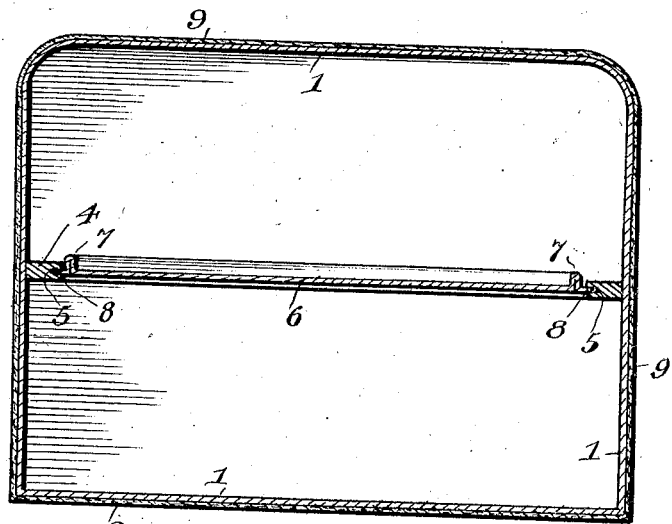
Figure 3 is a vertical transverse section taken upon the line 3—3 of Figure 2.
Figure 4:
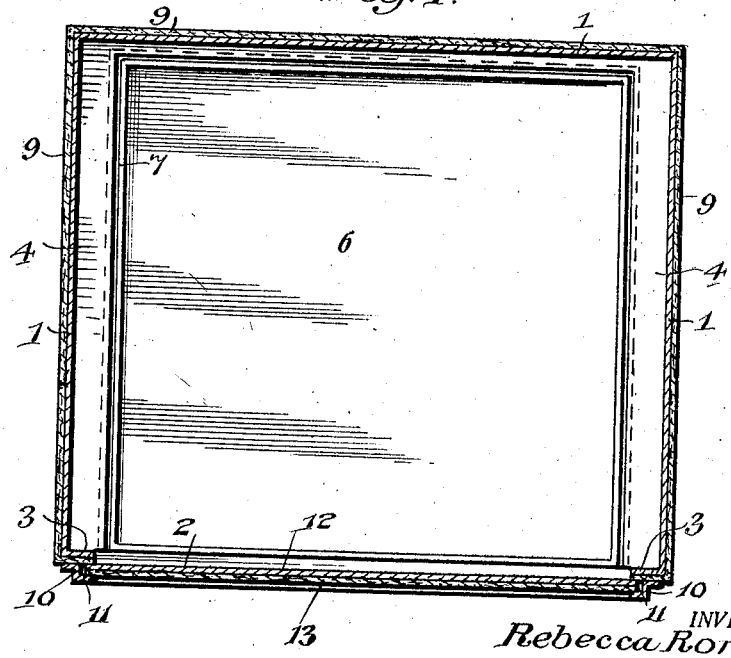
Figure 4 is a horizontal section taken upon the line 4—4 of Figure 1.

Referring now to the drawings in detail wherein like numerals of reference indicate corresponding parts throughout the several views, the device embodying this invention comprises a polygonal receptacle, preferably constructed of galvanized iron and indicated generally by the numeral 1. This receptacle comprises, top, bottom, back and side walls formed integral throughout, with the front side thereof open, as at 2. The sides of the receptacle extend partly over the open front thereof, forming the vertically extending side strips 3 which are located at and form the sides or borders of the opening in the front of the receptacle.

Extending from the front to the back of the receptacle, along the inner side of each side wall and preferably mid-way between the top and bottom thereof, is a flat cleat 4, along the inner edge of which there is formed the groove 5, as shown in Figure 3. The inner edge of these strips projects a slight distance beyond the vertical edge of the adjacent side strip 3, and there is provided a tray 6, formed about and adjacent its edges with an integral upstanding bead 7 and this bead merges into a right angularly extending flange 8, which extends throughout the side edges of the tray, and this flange 8 is adapted to slide in the grooves 5, through the opening 2 in the front of the receptacle, to retain the tray 6 in position within the receptacle.

The entire outer surface of the receptacle 1 is covered by a closely adhering layer of asbestos 9, which serves to insulate the receptacle and acts to maintain any hot food therein, in a hot condition a longer period of time than would be the case if the receptacle were not covered by this asbestos.

Extending vertically along the outer face of the strips 3 which form the side posts or members of the opening 2 in the front of the receptacle, is a substantially Z-shaped member 10, one leg of which is secured against the face of the strip and the other leg stands out from and is directed towards the opposite side of the receptacle, thus setting up between the outer face of strips 3 and the last mentioned leg of the strip 10, guide spaces 11, in which guide spaces or grooves the side edges of a vertically movable cover door 12 slide. The outer surface of this door 12 is likewise covered with a sheet covering of asbestos 13. The upper edge of the door 12 is turned outwardly and downwardly to provide the lips 14 which constitute a finger hold for raising the door to open the receptacle.

The top of the receptacle is provided with the right angled brackets 15, positioned one adjacent each side of the receptacle and having one leg secured to the top thereof and the other leg extending vertically therefrom. The upstanding portions of the brackets 15 are each provided with an aperture for the passage of one end of the bail wire 16, which end is rolled as at 17, to prevent the end from slipping from the aperture.

At the central portion of the bail 16, there is positioned a wooden handle 18, as shown.

It will be noted upon reference to Figure 3, that the tray 6 is formed of a single sheet of material, and in the forming a portion thereof, inwardly of the edges, is struck up and pressed together to form the surrounding bead or flange 7, and the side edges of the tray are left extending outwardly at right angles to the bead and in alignment with the body of the tray to provide the supporting flange 8, which slides in the grooves 5 in the side cleats 4.

From the foregoing description it will be seen that there has been provided a unique and very efficient food storage and transportation receptacle adapted to be used for transporting food while hot over long distances, without allowing the food contained therein to become cold, and the tray 6 which normally constitutes a shelf in the receptacle, can also be used as a serving tray for the food, and due to the flange 7 which surrounds the tray, any liquid foods which may spill from their containers when the receptacle is being carried, will not run out or in the bottom of the container to get into other foods.

Having thus described my invention, what I claim is:—

A receptacle of the character set forth having top, bottom, back and side walls, a closure constituting a front wall, a cleat secured to the inner side of each side wall and of said back wall, each cleat having a groove formed in the inner edge thereof, a tray having a surrounding struck up bead formed upon the upper side thereof, and a flange extending laterally from three sides of said bead and adapted to fit and slide in the groove in said cleats.

In testimony whereof, I affix my signature hereto.

REBECCA RONALD.